June 20, 1944.  J. C. HANNA  2,351,761
HYDRAULIC ACCUMULATOR
Filed Aug. 20, 1942   2 Sheets-Sheet 2
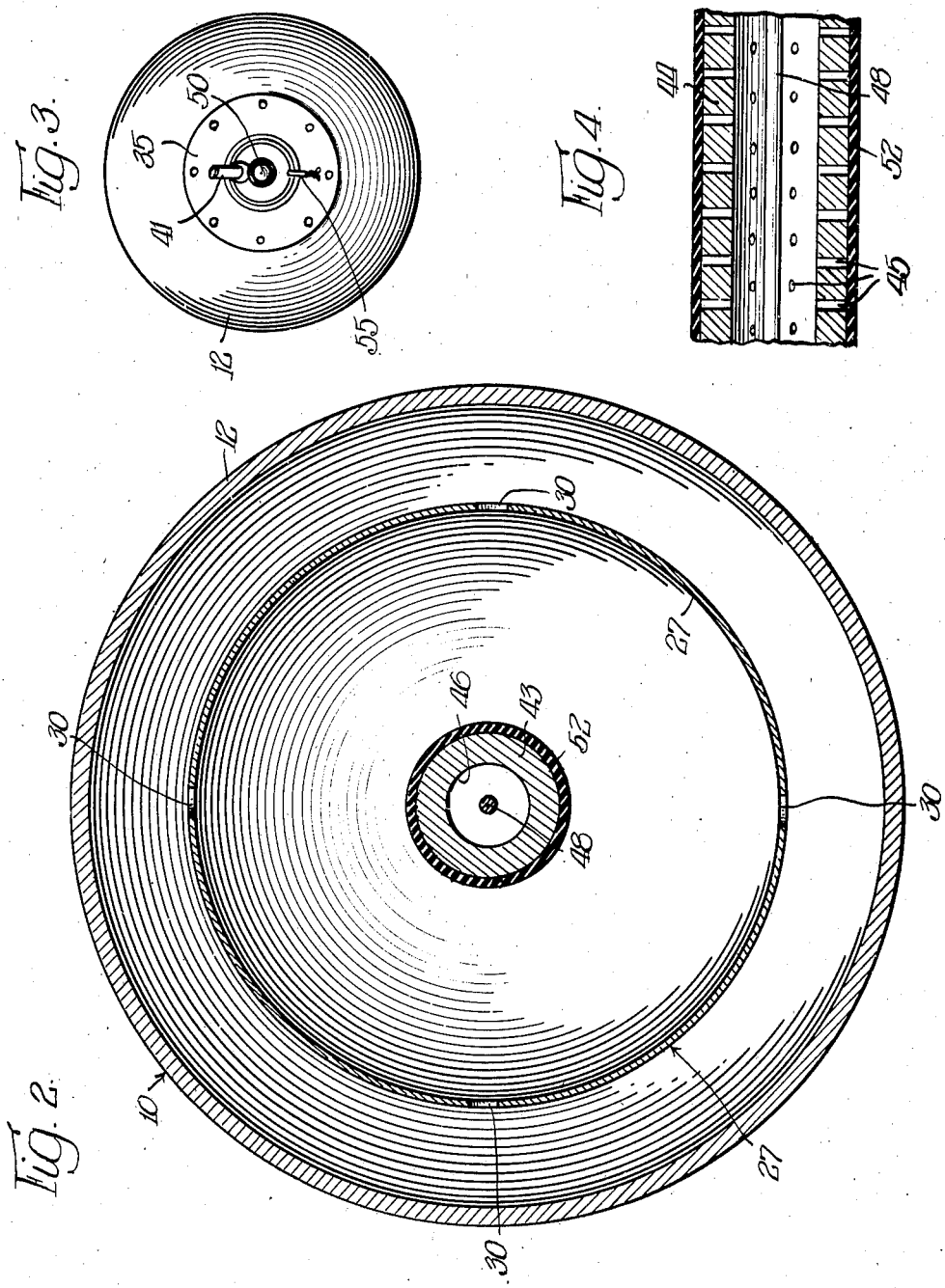
INVENTOR.
John C. Hanna,
BY Patented June 20, 1944

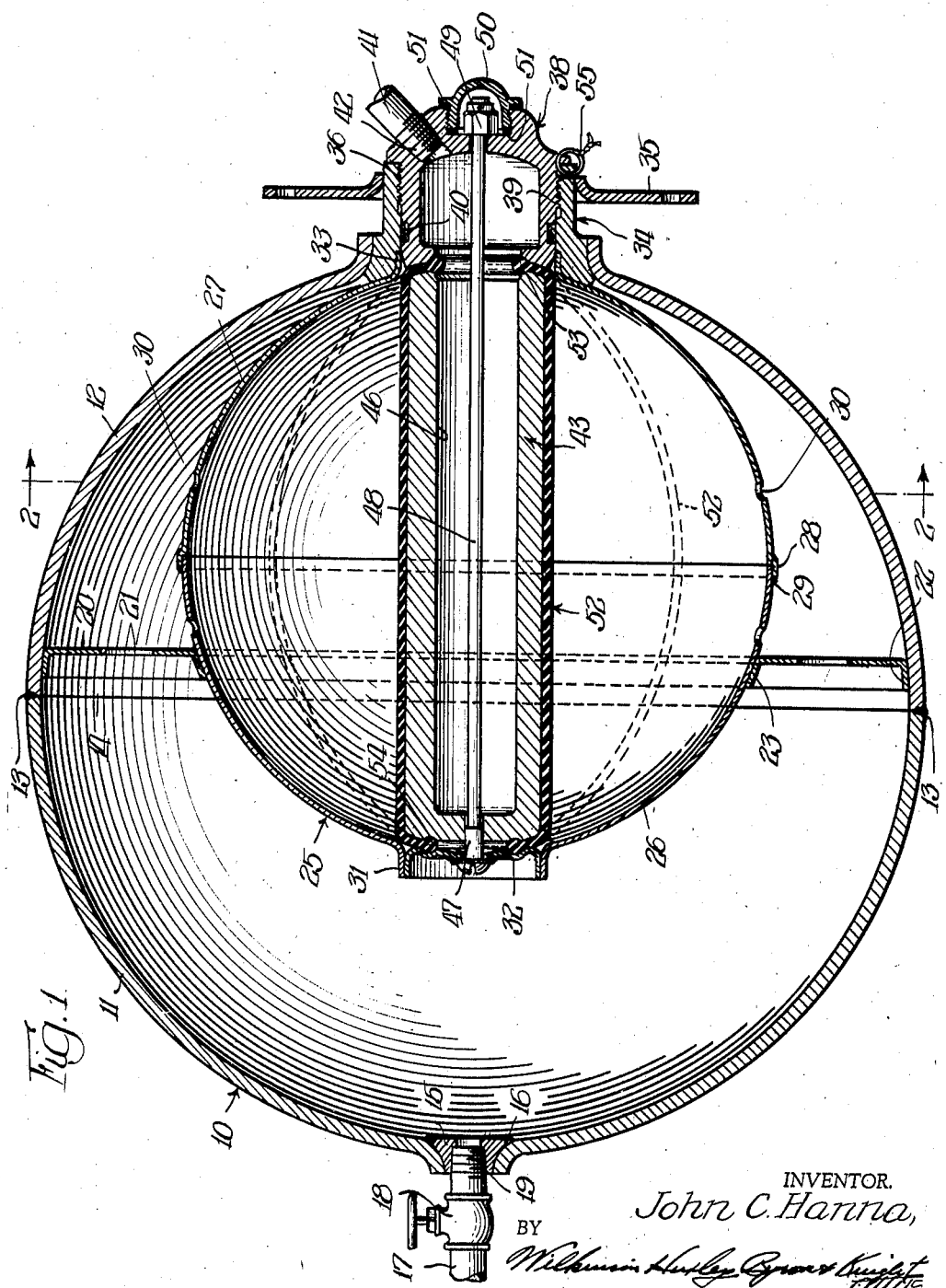

2,351,761

UNITED STATES PATENT OFFICE 2,351,761

HYDRAULIC ACCUMULATOR

John C. Hanna, Chicago, Ill., assignor to Hanna Engineering Works, Chicago, Ill., a corporation of Illinois Application August 20, 1942, Serial No. 455,523

9 Claims. (Cl. 138—30)

The invention relates to hydraulic accumulators and has reference more particularly to improved apparatus of this character for use on aircraft and which will store up hydraulic power by forcing a liquid into a closed vessel against a source of elastic pressure such as compressed gas, the power to be expended later by discharging the liquid into a hydraulic work producing device.

In general, hydraulic accumulators are used to provide a medium of storing hydraulic power so that the output from a relatively small liquid pump can be stored and used to meet a much larger but intermittent demand.

It is an object of the present invention to provide an hydraulic accumulator which will meet certain necessary requirements for aircraft. Some of these requirements are that the unit must be mechanically strong and reliable, and weight and occupied spaced must be kept to a minimum.

A further object of the invention is to provide an hydraulic accumulator of substantially spherical exterior shape so as to meet the requirement of strength to resist internal pressure with minimum size and weight for a given volume.

Another object resides in the provision of an accumulator which will make use of a compressed gas as the source of elastic pressure, thereby reducing weight to the greatest possible extent without sacrificing efficiency.

In aircraft it is desirable to provide a high pressure hydraulic system so that sufficient power can be obtained from small lightweight hydraulic mechanism. The high pressures encountered make it absolutely necessary to prevent leakage of the compressed gas into the hydraulic fluid and of the hydraulic fluid into the compressed gas. For this reason the present invention employs a diaphragm structure which eliminates the necessity of a seal between moving parts.

To further improve the volumetric efficiency and symmetry of the present unit, the smaller sphere containing the liquid has been placed inside the large sphere containing the compressed gas.

A positive shut-off or bypass for the hydraulic pump is necessary as the accumulator reaches maximum capacity. This is accomplished in the present invention by providing a stop for the diaphragm preventing further expansion by the liquid within. Should pressure in the receiver increase after the stopping of flow of liquid into the receiver such pressure differential can be used to directly or indirectly operate pump-stopping or bypassing mechanism.

A further object is to provide an hydraulic accumulator in which replacement of parts subject to wear is provided for by so designing and arranging the said parts that they can be readily removed from the main unit as a sub-assembly.

With these and various other objects in view the invention may consist of certain novel features of construction and operation as will be more fully described and particularly pointed out in the specification, drawings and claims appended hereto.

In the drawings which illustrate an embodiment of the invention and wherein like reference characters designate like parts—

Figure 1 is a vertical sectional view taken substantially through the center of the present hydraulic accumulator showing the internal construction of the same, including the releasable means for holding certain of the parts in assembled relation;

Figure 2 is a sectional view taken substantially along line 2—2 of Figure 1;

Figure 3 is a front end view of the present hydraulic accumulator; and

Figure 4 is a fragmentary sectional view showing a modified form of cylinder on which the rubber diaphragm is mounted.

Referring to the drawings, particularly Figure 1, the embodiment of the invention disclosed includes a spherical container 10 which substantially houses all the operative parts of the present hydraulic accumulator. For economy in manufacture and for convenient assembly of the various parts within the spherical container, the same consists of two half shells 11 and 12 of substantial thickness to provide sufficient strength for withstanding the gas pressure within the container and which are welded together at 13 along the line 14. The shells 11 and 12 are preferably of stainless steel and shell 11 is provided with the tapered ring portion 15 welded at 16 to the central opening formed in said shell and which receives the pipe connection 17 having valve 18. Said pipe connection is provided with the threaded end 19 which is threaded to ring portion 15. A high pressure gas is introduced into the container through pipe 17 and the said gas is held within the container by closing the valve 18.

Before the half shells 11 and 12 are welded together to form a spherical container the part 12 is provided with a substantially diametrical partition 20 having a plurality of openings 21 and also having a bent flange 22 around the exterior thereof and a similar bent flange 23 which defines the central opening in the partition. It will be observed that both flanges 22 and 23 are bent in the same direction although this need not necessarily be the case. Flange 22 is in contact with the interior surface of part 12 and as a result of this contact the partition 20 is retained in place.

An inner spherical container, identified in its entirety by numeral 25, is also suitably secured to the half shell 12. The inner spherical container includes two half sections 26 and 27, the former section fitting within the central opening in the partition 20 so that the flange 23 contacts the same and section 27 being secured to the half shell 12. Section 27 is outwardly flanged at 28 to receive section 26 and in this manner the two are secured together, being suitably welded at 29. A number of small openings 30 in container 25 allow the compressed gas to flow into and out of the container. The openings 30 are provided for the same reasons as openings 21 in partition 20 since the invention requires that the compressed gas within the main spherical container 10 flow within the inner container 25 and also that said gas flow in the opposite direction under certain operating conditions. The upstanding circular flange 31 on section 26 retains a metal washer 32. In a somewhat similar manner section 27 is provided with a circular upstanding flange 33 which, however, has contact with the neck portion 34 of the present hydraulic accumulator.

Referring more particularly to said neck portion 34, it will be observed that the same has a gradually flaring throat formed on its inner end for receiving the cylindrical flanged part 33 of the inner container. Opposite the gradually flaring throat on the exterior of the member the same is suitably secured to the main spherical container 10. The remainder of the neck portion is substantially cylindrical, the same retaining the conventional mounting plate 35 welded to its exterior and said neck portion has threads 36 formed in its interior. A closure member 38 is provided to close the opening of the cylindrical neck portion. Said member on its exterior portion has threads 39 which coact with threads 36 when the member is properly retained within the neck portion. A packing gland 40 prevents any gas from leaking past said threads. The pipe connection 41 is suitably threaded to the closure member at 42 and by means of said pipe connection liquid is supplied to the interior chamber of the member and to the cylinder 43 which will now be described in detail.

Said cylinder has a length approximately equal to the diameter of the inner container 25. Therefore the cylinder extends from adjacent the metal washer 32, free to slide within the flange 31, to adjacent the cylindrical neck portion 34 at the opposite end of the spherical container 25. The cylinder, as shown in Figure 1, preferably consists of sintered aluminum for the reason that a very porous cylinder is desired so that the hydraulic liquid may flow through the walls of the cylinder in both directions. For certain reasons it might be found desirable to make the cylinder 43 of a solid material and perforate the same with a plurality of small holes which will likewise function to allow flow of the liquid material in both directions through the walls of the cylinder. In Figure 4 this modification is shown in fragmentary sectional view, the same including cylinder 44, having a plurality of small openings 45 in the wall thereof. The following description of cylinder 43 and its function applies equally well to cylinder 44.

One end of the cylinder has an opening substantially equal in diameter to the internal recess 46 which extends into the cylinder to adjacent the opposite end. The wall at this opposite end has a much smaller opening, which is just large enough to receive the head portion 47 of an elongated retaining bolt 48 which extends longitudinally through the cylinder and through the chamber of the closure member to project beyond said closure member. A nut 49 is threaded to the projecting end and a bonnet 50, suitably threaded to the closure member, forms a housing for said nut. To prevent leakage of the hydraulic liquid along the bolt 48 gaskets 51 are used to seal the bonnet with respect to the closure member. Also head portion 47 is welded to washer 32 to prevent the gas from seeping under the head and thus escaping from the container.

The flexible diaphragm 52 of the present hydraulic accumulator is formed of rubber so that the same may have sufficient expansibility to store a supply of the hydraulic liquid and which will return to initial position when the hydraulic fluid is withdrawn. The rubber diaphragm when not expanded is cylindrical in shape, having openings at opposite ends and therefore it will be understood that the said rubber diaphragm almost entirely encloses the aluminum cylinder 43. The rubber at the periphery of each end opening is formed to provide bulbous portions such as indicated by numerals 53 and 54, respectively, and as a result thereof the diaphragm is suitably retained in proper assembled relation. The diaphragm in the vicinity of the bulbous portion 53 is clamped between the front end of cylinder 43 and the rear of closure member 38. In a similar manner the diaphagm in the vicinity of bulbous portion 54, and also including said portion, is clamped between the rear end of cylinder 43 and the washer 32. The clamping action is applied as a result of the elongated bolt 48 and the same can be varied by rotating nut 49.

Before operating the present accumulator the spherical container 10 is charged with gas to a predetermined pressure. This is done by connecting the spherical container through pipe 17 with a supply of gas under pressure. With valve 18 open the container can be charged to the pressure desired, whereupon the valve is closed. The compressed gas within the spherical container will flow through openings 21 and 30 into the inner container. This pressure on the rubber diaphragm 52 will maintain the same in contact with the cylinder 43.

The pipe 41 is connected to a conventional hydraulic system including some type of hydraulic pump. When pressure is set up in the hydraulic pump the liquid will enter the chamber in the closure member 38 and will flow through said chamber into the porous container 43. Since the walls of said container are porous as a result of the particular material constituting the same, or by reason of small openings 45 in the wall of the container, as shown in Figure 4, the liquid will flow into the rubber diaphragm 52. The resulting pressure will cause the diaphragm to expand and in Figure 1 an intermediate expanded position of said diaphragm is shown in dotted lines.

When the rubber diaphragm is in such expanded position it will be clearly understood that the hydraulic pressure within the same is in equilibrium with the gas pressure within the spherical container. Should the flow of liquid continue the rubber diaphragm will eventually contact the inner spherical walls of the container 25. Further outward expansion of the rubber diaphragm is thereby prevented. Since the rubber diaphragm can not further expand, the hydraulic pressure within, assuming that flow of the liquid continues, will rapidly increase to a higher value than the gas pressure. This pressure differential can be used to operate control mechanisms to either stop the hydraulic pump or by-pass the fluid around the accumulator.

When it is desired to expend the power stored within the hydraulic accumulator the pipe connection 41 is connected to some type of power consuming hydraulic mechanism. The internal gas pressure of the container 10 will force the liquid back into the hydraulic system and eventually to the power consuming mechanism connecting therewith. As the return flow of the liquid continues the rubber diaphragm will contract. The limit of this contraction is of course the cylinder 43 and all points on the rubber diaphragm will be in contact with the said cylinder when all the liquid has been returned to said cylinder. The gas pressure within container 10 will depend on the particular mechanism to be operated by the accumulator. Since expansion of the rubber diaphragm takes place against this pressure the same gradually increases as the size of the diaphragm increases. A high pressure is therefore available for returning the liquid to expend the energy stored therein.

The inner container 25 is mostly in the nature of a stop to limit excessive expansion of the rubber diaphragm which also may be termed the receiver for the liquid. The capacities of this receiver are therefore controlled since the diaphragm has a close fit on the rigid cylinder 43 in compressed position and its expansion is limited by the rigid walls of the inner container.

The present accumulator has been particularly designed for use on aircraft. A spherical shape for the container 10 was chosen because, from the standpoint of the fundamental mechanics involved, this shape provides the greatest strength to resist internal gas pressures with minimum size and weight for a given volume. Also by using compressed gas as a source of elastic pressure an advantage in weight is derived and the gas eliminates the necessity of a high grade seal between moving parts.

Provision is made for ready replacement of parts subject to wear by the particular design and arrangement of these parts whereby they can be removed from the unit as a sub-assembly. It will be necessary after continued use of the present accumulator to repair the rubber diaphragm 52 or possibly replace said diaphragm with a new one. This merely requires that the nut 49 be unscrewed from the elongated stem 48, whereupon the closure member and the cylinder and rubber diaphragm can be withdrawn. When the present accumulator is in use the closure member is locked to the cylindrical neck portion by the device 55. This prevents loosening of the parts under the excessive vibration to which they may be subjected.

Another feature of the present accumulator resides in the fact that the secondary or small sphere is located inside the main spherical container. This combination provides definite knowledge as to the conditions inside the accumulator. For example, if the pressure on the oil, as shown by an oil gauge, exceeds the pressure on the gas, as shown by a gas gauge, the exact volume of oil and volume of gas can be determined. The size of the secondary container in relation to the size of the main container may be varied to provide a definite requirement in volume of oil through a definite range of pressure. By consulting the two gauges located exteriorly of the accumulator it can always be determined with certainty how much work can be expected from the accumulator at any time.

The bulbous portions formed on the rubber diaphragm 52 serve not only to prevent a blow-out at the ends of the liquid receiver when it is expanded, but due to their tendency to become wedged between the confining surfaces a higher local hydrostatic pressure is set up in the rubber than the pressure of the oil per unit area. Thus, the bulbous portions are self-sealing. Also when the receiver is partly inflated the inner spherical container provides a support therefor, which is necessary since the accumulator may be suddenly accelerated or decelerated. There is considerable weight of oil in a partially inflated receiver and the momentum or energy of this oil might readily burst the receiver if it were not for a definite and rigid stop member functioning to limit movement of the oil resulting from said momentum. When the liquid receiver is in fully inflated position it will be understood that the openings 30 in the spherical container 25 are sufficiently small so that the unit liquid pressure on the diaphragm will not force the rubber through said openings nor far enough into the opening to even damage the rubber. Also when the receiver is deflated the holes in the cylinder 43 are likewise sufficiently small so that the unit gas pressure acting on the exterior of the diaphragm will not force the rubber into said holes nor damage the rubber. In this deflated position of the rubber diaphragm the same therefore acts as a seal preventing escape of the gas from the accumulator.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. An accumulator of the hydraulic type, in combination, a container, an expansible liquid receiver housed within the container, said receiver including a rigid internal supporting member and an elastic diaphragm in surrounding relation with the said internal supporting member, said container having an opening in the wall thereof through which said internal supporting member and diaphragm may be withdrawn as a unit, means for closing said opening, and a rigid stop member of substantially spherical shape within the container in surrounding relation with the expansible liquid receiver to thereby limit the expansion of said receiver.

2. An accumulator of the hydraulic type, in combination, a spherical container, an expansible liquid receiver housed within the container including a cylindrical internal supporting member and an elastic diaphragm in surrounding relation therewith, said supporting member having openings in its cylindrical wall whereby liquid will pass through said openings in flowing to and from the receiver, said container having an opening in the wall thereof through which said internal supporting member and diaphragm may be withdrawn as a unit, a removable closure member for closing said opening, means connecting with the closure member for fixedly securing the cylindrical member in operative position within the spherical container, said means also clamping the elastic diaphragm to the cylindrical member at the respective ends thereof, and a rigid stop member of substantially spherical shape within the container in surrounding relation with the expansible liquid receiver to thereby limit the expansion of said receiver.

3. An accumulator of the hydraulic type, in combination, a spherical container, an expansible liquid receiver housed within the container including a cylindrical internal supporting member an an elastic diaphragm in surrounding relation therewith, said supporting member having openings in its cylindrical wall whereby liquid will pass through said openings in flowing to and from the receiver, said container having an opening in the wall thereof through which said internal supporting member and diaphragm may be withdrawn as a unit, a removable closure member for closing said opening, means connecting with the closure member for fixedly securing the cylindrical member in operative position within the spherical container, said container having a gas under pressure within the same whereby liquid is stored in the receiver against said gas pressure, and a stop member of substantially spherical shape within the container in surrounding relation with the expansible liquid receiver to thereby limit the expansion of said receiver, and said spherical stop member having openings in the wall thereof to permit the free flow of gas to within said stop member.

4. In a device of the character described, a container having sufficient strength to withstand relatively high internal gas pressures, an expansible liquid receiver within the container, an inlet-outlet connection for the receiver extending through the wall of the container, said container having a gas under pressure within the same whereby liquid is stored in the receiver against said gas pressure, and a rigid stop member of substantially spherical shape within the container in associated relation with the expansible liquid receiver to thereby limit the expansion of said receiver, said stop member being perforated to permit the gas within the container to enter the stop member whereby the liquid receiver is subjected to said gas pressure, and said stop member also making possible an increase in the pressure of the liquid to an amount greater than the pressure of the gas within the container.

5. An accumulator of the hydraulic type, in combination, a container of spherical shape adapted to contain a gas under pressure, a cylindrical neck portion projecting from the container and providing a passage to the interior, a removable closure member having threaded connection with the neck portion for closing said passage, a liquid receiver extending diametrically within the container for a distance less than the diameter thereof and including a cylindrical member having perforated walls and an elastic diaphragm in surrounding relation therewith, means clamping the liquid receiver to the closure member in a manner to also clamp the elastic diaphragm at one end thereof between the cylindrical member and the closure member, a substantially spherical stop member supported within the container in associated relation with the neck portion whereby the passage provided by the neck portion leads to the interior of said stop member, said liquid receiver being arranged diametrically of the stop member, and said stop member having a plurality of openings in its wall to permit the gas within the container to enter the stop member whereby the liquid receiver is subjected to said gas pressure.

6. An accumulator of the hydraulic type, in combination, a container of spherical shape adapted to contain a gas under pressure, a cylindrical neck portion projecting from the container and providing a passage to the interior, a spherical member located within the container and having association with the neck portion whereby the passage provided by said portion leads to the interior of said spherical member, a closure member having threaded engagement with the interior wall of said neck portion for closing the passage, a liquid receiver extending diametrically of the spherical member and including a hollow cylinder member having perforated walls and an elastic diaphragm in surrounding relation therewith, means extending axially through the cylinder member for clamping the liquid receiver to the closure member, said means also clamping the elastic diaphragm to the cylinder member at respective ends thereof to seal said ends against the escape of liquid, and the wall of said spherical member having a plurality of openings to permit the gas within the container to enter the spherical member whereby the liquid receiver is subjected to said gas pressure.

7. In an hydraulic accumulator as defined by claim 6 wherein the passage provided by the cylindrical neck portion is sufficiently large to permit the liquid receiver as a unit to be inserted within or removed from the spherical member.

8. An accumulator of the hydraulic type, in combination, a container of spherical shape adapted to contain a gas under pressure, a cylindrical neck portion projecting from the container and providing a passage to the interior, a spherical member located within the container and having associated relation with the neck portion whereby the passage provided by said portion leads to the interior of said spherical member, a closure member having threaded engagement with the interior wall of said neck portion for closing the passage, said closure member being substantially cup-shaped and providing an interior cavity, a liquid receiver extending diametrically of the spherical member and including a hollow cylinder member and an elastic diaphragm in surrounding relation therewith, means extending axially through the cylinder member for clamping the liquid receiver to said closure member, said means also clamping the elastic diaphragm at one end thereof between the cylinder member and the closure member, the interior of said cylinder member having communication with said cavity and the walls of said member having a plurality of openings therein whereby liquid supplied to said cavity will be delivered to the member and flow through the walls thereof to expand the elastic diaphragm, and the wall of said spherical member having a plurality of openings to permit the gas within the container to enter the spherical member whereby the liquid receiver is subjected to said gas pressure.

9. An accumulator of the hydraulic type, in combination, a container of spherical shape, a cylindrical neck portion projecting from the container providing a passage to the interior, a removable closure member for said neck portion for closing the passage, a cylinder member supported within the container in a manner to form an inwardly directed extension of the closure member and with the interior of the cylinder member in communication with said passage, the wall of said cylinder member having a plurality of openings whereby liquid delivered to the interior of the member will flow through said openings, an elastic diaphragm in surrounding relation with the cylinder member to form an expansible liquid receiver therewith, a substantially spherical stop member within the container in surrounding relation with the liquid receiver to limit expansion thereof, and means releasably clamping diametrically spaced ends of the elastic diaphragm to said cylinder member, one end of the elastic diaphragm being clamped between the cylinder member and the closure member and the opposite end of the diaphragm being clamped between said cylinder member and a washer having supporting relation with the spherical stop member.

JOHN C. HANNA.